Dec. 21, 1926.  G. E. GICKER  1,611,308

BAIT CONNECTER

Filed Oct. 15, 1925

George E. Gicker
INVENTOR.

By Munn &co.
Attorney

Patented Dec. 21, 1926.

1,611,308

UNITED STATES PATENT OFFICE.

GEORGE E. GICKER, OF SAN DIEGO, CALIFORNIA.

BAIT CONNECTER.

Application filed October 15, 1925. Serial No. 62,681.

This invention relates to a bait connecter such as is used by fisherman, an object of the invention being to provide a connecter that is safe and strong and one in which the hook carrying the bait can be quickly applied and released.

Another object is to provide a connecter in which the hook is released by unwinding a tapered or conical spiral.

Another object is to provide a connecter in which the hook is closed and locked by a tapered conical spiral threaded through a portion of the hook.

With these and other objects in view the invention consists in certain novel features of construction and arrangement of parts as will be hereinafter more fully set forth and pointed out in the claims.

Referring to the accompanying drawings forming a part hereof, and in which similar reference characters indicate similar parts—

Figure 1:
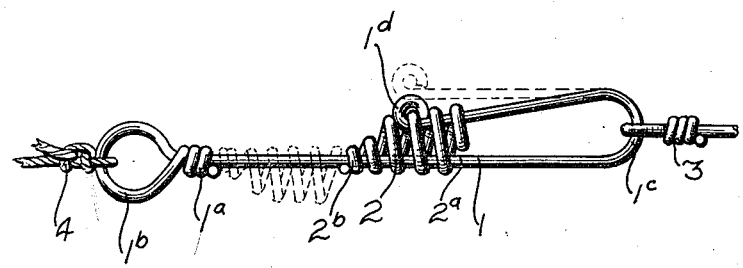
Figure 1 is a side elevation of the device as in use.
Figure 2:
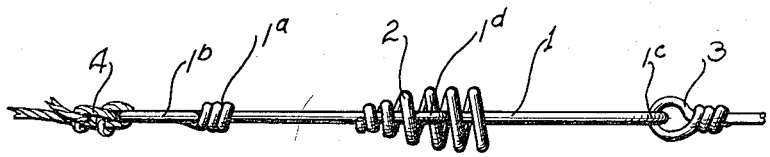
Figure 2 is a plan view of same.
Figure 3:
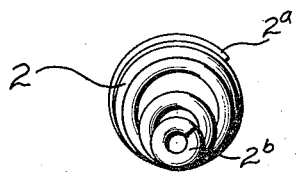
Figure 3 is an end view of the controlling spiral.

In the drawings 1 indicates a wire shaft bent at one end $1^c$ forming a main shank and an auxiliary shank to define a resilient loop or hook terminating in a guide eye $1^d$ as plainly shown in Figure 1; the other end of the main shank is formed into a large loop or eye $1^b$ the extreme end being tightly wound around the shank as indicated at $1^a$. To this loop $1^b$ is tied the usual fishing line indicated by 4.

Upon the shaft 1 is slidably mounted a wire spiral 2 which is tapered and somewhat cone shaped and comprises the end convolution or eye $2^b$ the diameter of which is such as to permit a rotary and progressive longitudinal movement with respect to the shaft 1. As shown the rear portion of the spiral is cone-shaped while the forward portion is generally cylindrical the free end $2^a$ of the front convolution adapted to engage the guide eye $1^d$ of the connecter hook. In the bend of this hook $1^c$ is placed the bait indicated by the numeral 3.

As shown in Figure 1 the bait 3, is safely held within the loop. Now to remove the bait for replacing, etc., the tapered spiral is "screwed" toward loop $1^b$, the convolutions screwing through eye $1^d$ until the end $2^a$ leaves the eye and assumes the position on the main shank shown in dotted lines Figure 1, whereupon the auxiliary shank springs away from the main shank and the spiral coil, as indicated in dotted lines Figure 1, thus opening the loop and from which the bait can be readily removed. To replace the bait 3 is readily slipped over the eye $1^d$ and into the bend thereof; the coil 2 is now advanced along the main shank, and the end $2^a$ engaged in the eye $1^d$ and a rotary screwing movement is then given the spiral. The convolutions of the spiral threading through said eye and inclosing the auxiliary shank of the loop until the diminishing diameter of the spiral prevents farther movement and securely locks the loop in closed position and holds the spiral in place; when the spiral is wound on the hook it can go only a certain distance and holds the hook firmly in place.

The invention has strong values of safety because of its particular construction. Thus, when the hook is released by unwinding or screwing off the spiral, the bait is attached to the hook, the spiral is rewound by a few turns, and the hook cannot become unfastened no matter how strong the fish or how vigorous a fight it puts up.

Another feature of safety is that when the hook $1^c$ is opened (and this happens many times in actual practice) it is not necessary to "spring" the hook, as is done with the hooks in common use. When the hook has to be "sprung" open many times it eventually crystallizes the end of the hook at the bend, and the same breaks and the fish is lost.

Having thus fully described my invention what I claim as new and desire to secure by Letters Patent is:

1. An angling device comprising a main shank a resilient hook at one end thereof, a guide element at the free end of the hook, a tapered spiral rotatable about the shank and having the base terminal adapted to engage said guide element and travel longitudinally on the shank and hook to hold the latter in closed position.

2. An angling device comprising a main shank terminating at one end in a resilient return-hook said hook having a guide eye at its free end, a spiral screw-wire rotatable about the shank and one terminal of the spiral threading through said eye of the hook, the spiral traveling longitudinally on the shank and bill of the hook to fasten or release the same.

3. The device as set forth in claim 2, the spiral having a tapered guide portion, and a cylindrical portion, the tapered portion providing a limiting stop to longitudinal movement.

GEO. E. GICKER.